Nov. 5, 1957  J. L. FERGUSON, SR., ET AL  2,811,943
APPARATUS FOR APPLYING ADHESIVE
TO THE FLAPS OF CASES OR CARTONS
Filed Jan. 19, 1954  5 Sheets-Sheet 1

INVENTORS
JOHN L. FERGUSON, SR.
BY & RICHARD C. TALBOT

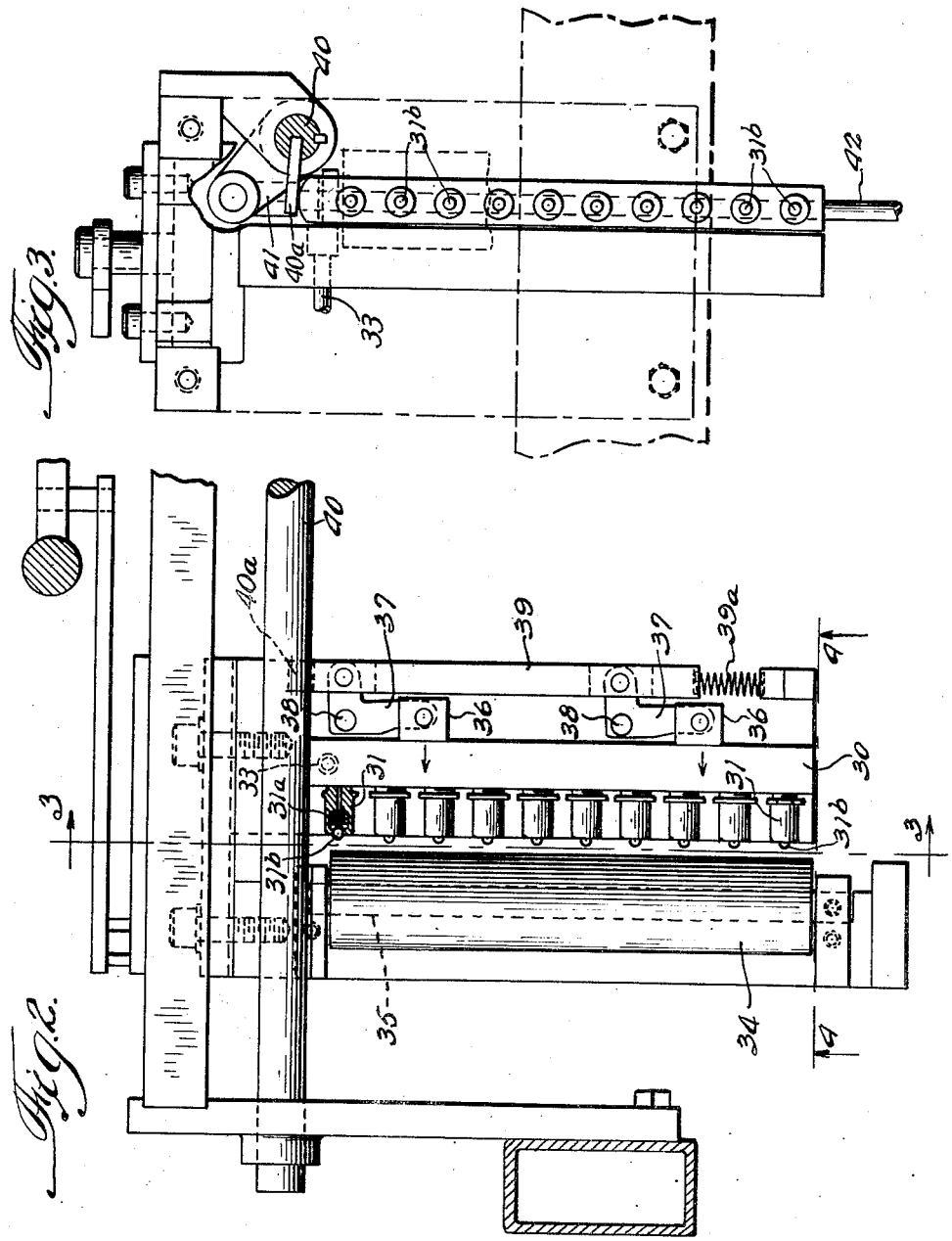

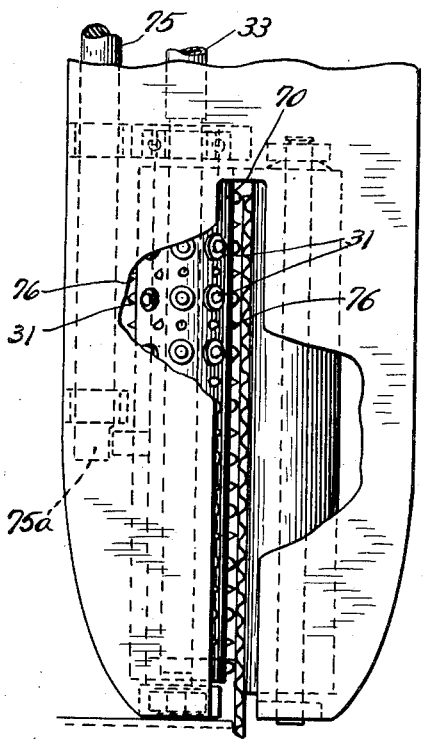
Fig.5.
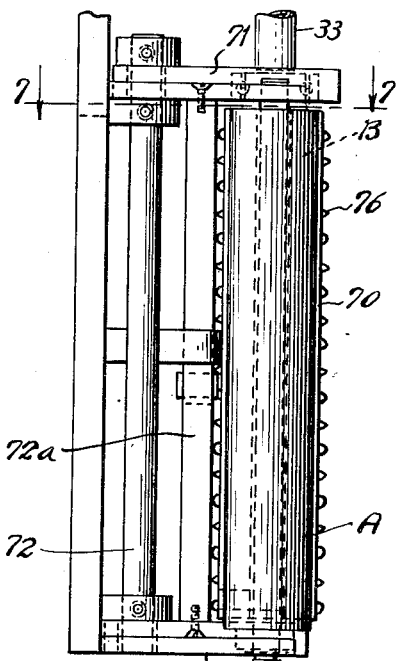
Fig.6.
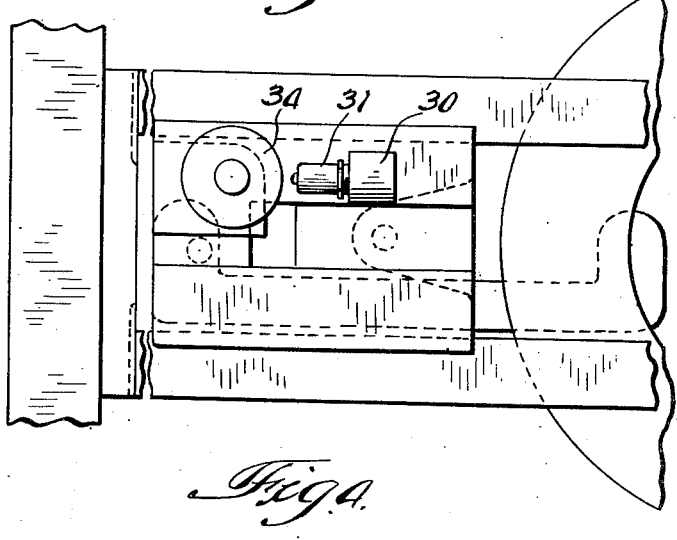
Fig.4.
Fig.7.
INVENTORS
JOHN L. FERGUSON, SR.
& RICHARD C. TALBOT Nov. 5, 1957
J. L. FERGUSON, SR., ET AL
APPARATUS FOR APPLYING ADHESIVE
TO THE FLAPS OF CASES OR CARTONS
2,811,943
Filed Jan. 19, 1954
5 Sheets-Sheet 4
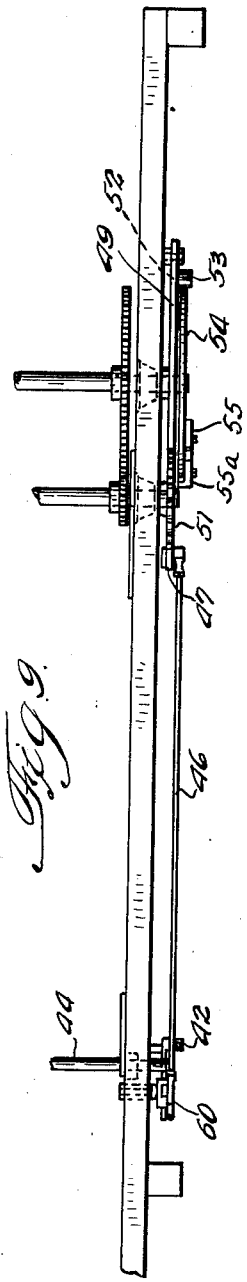
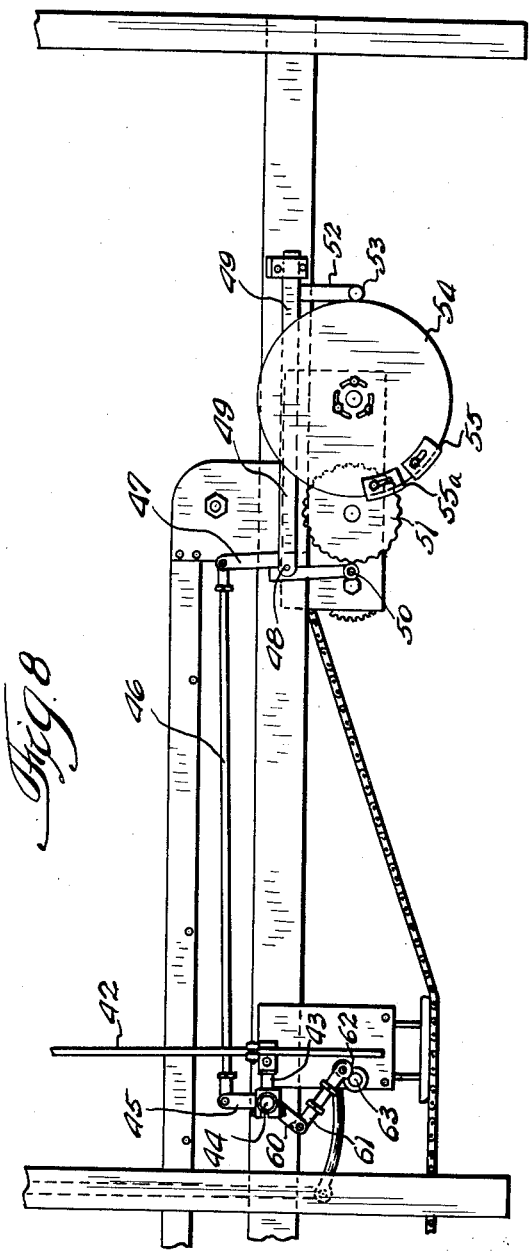
INVENTORS
JOHN L. FERGUSON, SR.
& RICHARD C. TALBOT
BY Nov. 5, 1957 J. L. FERGUSON, SR., ET AL 2,811,943
APPARATUS FOR APPLYING ADHESIVE
TO THE FLAPS OF CASES OR CARTONS
Filed Jan. 19, 1954 5 Sheets-Sheet 5

INVENTORS
JOHN L. FERGUSON, SR.
& RICHARD C. TALBOT
BY

United States Patent Office 2,811,943
Patented Nov. 5, 1957

2,811,943

APPARATUS FOR APPLYING ADHESIVE TO THE FLAPS OF CASES OR CARTONS

John L. Ferguson, Sr., and Richard C. Talbot, Joliet, Ill., assignors to J. L. Ferguson Company, Joliet, Ill., a corporation of Illinois Application January 19, 1954, Serial No. 404,976

6 Claims. (Cl. 118—3)

This invention relates to a machine for sealing cases, and more particularly to a machine for applying adhesive to the flaps of a case. It is an object of the invention to provide an improved machine of that character.

It is common practice to apply an adhesive to the inner sides of the outer flaps of a case by a roller. Glue or other adhesive is thereby applied in an uninterrupted film, following which these outer flaps are folded shut and maintained in a closed position until the adhesive has set or dried. The outer flaps are thereby made to adhere to the inner flaps whereby the case is sealed shut. With such an arrangement for applying adhesive, a relatively long period of time is required for the adhesive to set or dry, which is objectionable since the flaps are necessarily maintained in their closed positions until the adhesive sets.

According to one embodiment of the present invention, the adhesive is applied in small, discrete areas, for example in narrow lines or in small dots. It has been found that when adhesive is so applied, it sets much more rapidly than when the adhesive is applied in a large uninterrupted film. This means that the flaps need be held in their closed positions for a relatively short period of time after application of the adhesive.

Accordingly, it is another object of the invention to provide improved apparatus for applying adhesive in small discrete areas to the closing flaps of a case.

In accordance with the preferred embodiment of the invention, the adhesive is actually applied to the closing flaps of a case through pressure-operated valves, adhesive being applied under pressure to the inner sides of the valves, and the valves being operated to permit flow of adhesive by pressure of the closing flap thereagainst.

Accordingly, it is another object of the invention to provide improved apparatus for applying adhesive in small discrete areas to the closing flaps of a case through pressure-operated valves.

For practical reasons it is conventional to arrange cases during flap gluing and sealing operations with the flaps at top and bottom. In accordance with the preferred embodiment of the invention, the adhesive is applied to the outer closing flaps of a case while these flaps extend vertically, that is, while the flaps lie substantially in the same vertical plane with the sides to which they are attached. It has been found that this arrangement reduces the required width and length of the machine as opposed to the conventional arrangement wherein the closing flaps are turned outwardly to horizontal positions for application of adhesive thereto.

Accordingly, it is another object of the invention to provide an improved machine for applying adhesive to the closing flaps of the cases while the flaps extend vertically.

This invention, together with further objects and advantages thereof, will best be understood by reference to the following description taken in connection with the accompanying drawings, and its scope will be pointed out in the appended claims.

In the drawings, in which like parts are designated by like reference numerals,

Fig. 2 is an enlarged, partial view of flap-gluing apparatus incorporated in the machine of Fig. 1;

Fig. 3 is a sectional view of the apparatus of Fig. 2, taken along the line 3—3 thereof;

Fig. 4 is a sectional view of the apparatus of Fig. 2, taken along the line 4—4 thereof;

Fig. 5 is an elevational view of flap-gluing apparatus illustrating another embodiment of the invention;

Fig. 6 is a side view of the apparatus shown in Fig. 5;

Fig. 7 is a sectional view taken along the line 7—7 of Fig. 6;

Fig. 8 is an elevational view of driving gear for the gluing apparatus of Figs. 1—4;

Fig. 9 is a plan view of the driving gear of Fig. 8; and

Figs. 10–15, inclusive, are views of a single closing flap of a case illustrating various patterns of adhesive applied thereto by the apparati of Figs. 1–9.

Figure 1:
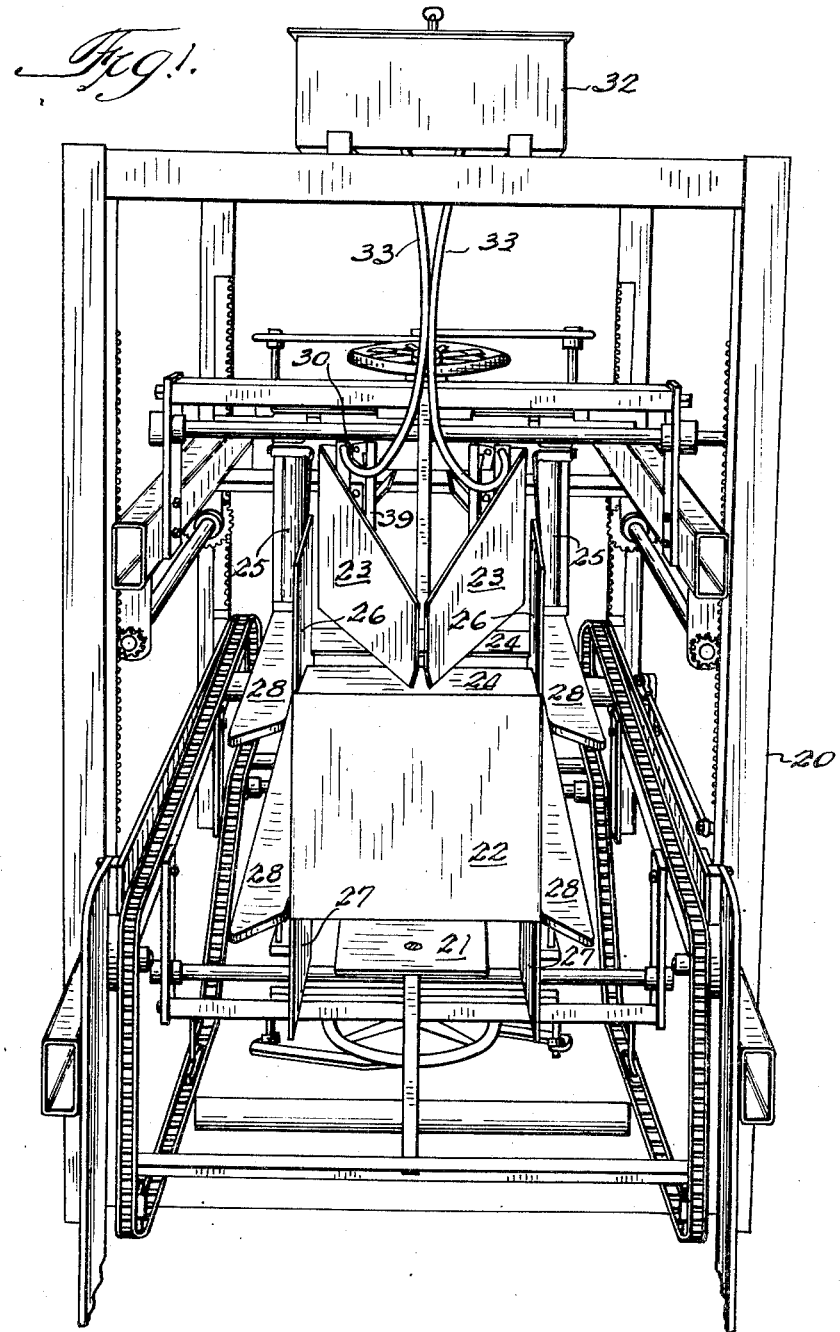
Figure 1 is a perspective, over-all view of a machine illustrating one embodiment of the invention.

The apparatus which constitutes the present invention would normally form a part of an over-all case gluing and sealing machine such as that illustrated in Fig. 1. Certain parts of this over-all machine are conventional and are described only briefly herein.

Supported within the frame 20 of the machine is a platform 21 upon which cases 22 may be placed, either manually or automatically. The cases 22 when placed on the platform 21 are filled and are ready for the closing and sealing of the flaps. It will be noted in Fig. 1 that the upper side of the case 22 is an open side having closing flaps, the inner flaps being closed and the outer flaps standing erect, ready for the application of adhesive to the inner surfaces thereof. The bottom side of the case is in a similar condition, the inner flaps (not visible) being closed and the outer flaps extending downwardly, ready for the application of adhesive.

Arranged above the platform 21 by a distance substantially equal to the height of a case 22 are a pair of guides 23 which serve to hold the upper inner flaps 24 in closed position. These guides 23, in conjunction with outer guides 25, also serve to maintain the outer flaps 26 in their proper vertical position for application of adhesive thereto. Other guides, not shown in the drawings but having a similar function, are provided for the lower outer flaps 27. Guide rails 28 are provided for maintaining the case itself in proper lateral position on the platform 21.

Suitable means may be provided for automatically moving the case 22 through the machine. Since such conveying apparatus does not constitute a feature of the present invention and since it is common in the art, it is not described in detail herein.

In Figs. 2, 3, and 4, there may be seen apparatus for applying adhesive to the inner side of one of the upper closing flaps 26. Included in this apparatus is a box-like member 30 having a plurality of pressure-operated valves 31 secured to one side thereof. These valves may be of a form well known in other arts, in which a spring 31a resiliently urges a ball 31b outwardly into closed position. Pressure against the ball 31b from outside the valve moves the ball inwardly against the action of the spring to open the valve.

A supply of adhesive is contained in a tank 32 (seen in Fig. 1) and is fed through a flexible tube 33 to the box-like member 30 which, in turn, permits the flow of adhesive to the rearward or inner side of each of the pressure-operated valves 31.

Arranged directly opposite the valves 31 is a backing roller 34 mounted for free rotation on a suitable shaft 35, as indicated. As will now be described, the member 30 is arranged to carry the valves 31 toward and away from the backing roller 34 whereby a case flap lying intermediate the roller and the valves may be pressed therebetween, the resulting pressure serving to open the valves and permit flow of adhesive onto the flap.

The box-like member 30 is provided with a pair of flanges 36 to which are pivotally connected a pair of bell cranks 37. These bell cranks are pivotable about fixed shafts 38 and the other ends of the bell cranks are pivotally secured to a common bar or link 39. The link 39 is urged upwardly by a spring 39a whereby the valves 31 are normally maintained to the right in the position illustrated in Fig. 2.

A drive shaft 40 arranged near the upper end of the bar 39 has a lever 40a secured thereto which is engageable with the upper end of the bar 39. It will readily be seen by reference to Figs. 2 and 3 that when the drive shaft 40 is oscillated in such a direction as to lower the lever 40a, the latter will depress the bar 39 against the action of the spring 39a and cause the box-like member 30 and the associated pressure-operated valves 31 to move to the left (in Fig. 2). This brings the valves closer to the backing roller 34.

It will be noted in Fig. 1 that the apparatus of Fig. 2 is in such position that the left-hand upper closing flap 26 of each successive case is guided between the valves 31 and the backing roller 34 as the case 22 is advanced through the machine. Similar apparatus is provided for the right-hand upper case flaps, and for the lower case flaps where desired.

As is explained in detail below, the operation of the gluing apparatus of Fig. 2, described immediately above, is made to synchronize with movement of the cases 22 through the machine such that the valves 31 are moved to the left in Fig. 2 when a case flap 26 is arranged between the valves 31 and the backing roller 34. With the valves 31 moved to the left by the depressing of the bar 39, they are so spaced from the backing roller 34 that a case flap 26 therebetween will press against the valves 31 to open the valves and permit the flow of adhesive.

Figure 10:
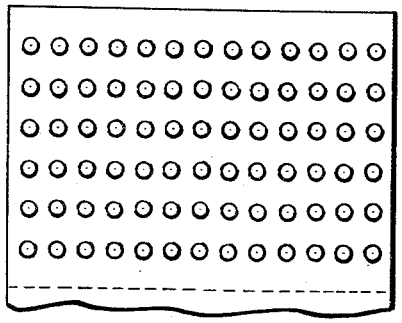

According to one embodiment of the invention the drive shaft 40 is rapidly oscillated whereby the valves 31 are rapidly brought into contact with the case flaps 26 and rapidly withdrawn from such contact. Each valve thereby is made to deposit a series of dots of adhesive to a single case flap 26 as it passes between the valves 31 and the backing roller 34. Such a pattern of applied adhesive is illustrated in Fig. 10. By arranging the valves 31 in two staggered rows, a pattern such as that shown in Fig. 11 may be obtained. In such case, the backing roller 34 may be replaced by a flat plate or by a pair of rollers whereby backing means are provided for both rows of valves.

Figure 12:
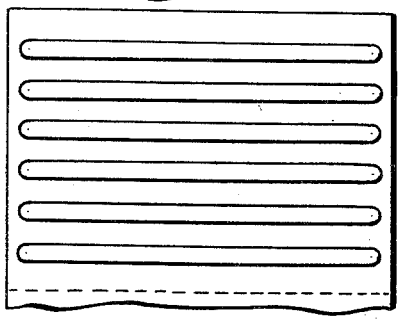
Figure 13:
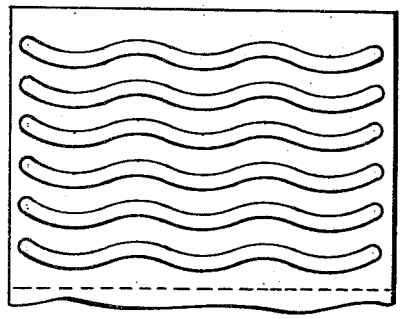

Alternatively, the valves 31 may be retained in contact with the case flap 26 from a time shortly after the entrance of the lead edge of the case flap between the valves 31 and the backing roller 34 until a time shortly before the trailing edge of the same flap emerges from a position between the flaps and the backing roller. In such case, each valve 31 deposits a straight narrow line of adhesive along substantially the entire length of the case flap, as illustrated in Fig. 12. Also, either the valves 31 or the case 22 may be made to rise and fall cyclically a short distance during the passage of the case flap 26 whereby each valve deposits a thin, undulating line of adhesive to the case flap as illustrated in Fig. 13.

Figure 14:
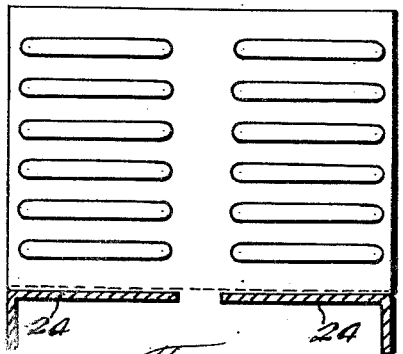

The drive shaft 40 rather than being operated only once during the passage of a case flap between the valves and the back-up roller to produce the pattern of adhesive illustrated in Fig. 12, may be operated twice, whereby skip gluing is obtained as illustrated in Fig. 14. Such skip gluing is desirable in instances wherein the inner case flaps 24 do not substantially meet at the center of the case but, instead provide a substantial gap therebetween as illustrated in Fig. 14. Skip gluing eliminates the possibility of glue contacting the contents of the case and avoids the waste of glue, which would otherwise result from the application of adhesive to the center portions of the outer case flaps, since the center portions do not contact any portion of the inner flaps.

Similarly, the drive shaft 40, instead of being continuously and rapidly oscillated to produce the dot pattern of adhesive illustrated in Fig. 10, may be oscillated rapidly to produce a relatively short row of dots and then remain briefly stationary with the valves removed from the case flap, and subsequently again oscillated rapidly. This produces a pattern such as that shown in Fig. 15. This pattern is similar to Fig. 10 with the exception that it provides for skip gluing with the advantages indicated above.

It has been indicated above that the cases 22 may be automatically carried along the platform 21 and past the glue applicators. The same drive means which conveys the cases 22 can readily be made to cause oscillation of the drive shaft 40 in any desired manner through any one of various commonly known drive means. One form of such drive means is illustrated in Figs. 3, 8 and 9. In Fig. 3 it may be seen that an arm 41 is secured to the shaft 40 and a rod 42 is pivotally connected to this arm. In Fig. 8 the rod 42 is shown pivotally and adjustably connected to an arm 43 which is secured to a shaft 44. Adjustability is provided in order that the gluing apparatus may be raised and lowered to adapt this machine to different sizes of cases, as suggested above.

The shaft 44 is caused to oscillate by an arm 45 which is connected by a link 46 to the upper end of a lever assembly 47. This lever pivots about a floating pin 48 which is supported by a sliding bar 49. At the lower end of the lever assembly 47 is a roller 50 which may be made to cooperate with a cam 51.

At the right-hand end of the sliding bar 49 an arm 52 is secured thereto, this arm carrying a roller 53 at its lower end. The roller 53 follows a cam wheel 54 which carries thereon a pair of adjustable cam lobes 55 and 55a.

The cam wheel 54 is made to rotate in synchronism with and in phase with the conveying apparatus employed for moving successive cases through the machine. As the cam wheel rotates it will be seen that the two cam lobes will strike the roller 53 in succession and force the roller to the right. This moves the sliding bar 49 to the right and brings the roller 50 into contact with the cam 51, whereupon the lever assembly 47 and hence the rod 46 and ultimately the rod 42 are caused to oscillate. This in turn causes the glue valves 31 to move toward and away from the backing roller 34 as previously described.

The cam lobes 55 and 55a are so positioned on the cam wheel 54 that they strike the roller 53, and thus set the gluing apparatus in operation when case flaps are passing through the gluing apparatus. In this manner, operation of the gluing apparatus is obtained only when case flaps are in position between the valves 31 and the back-up roller 34.

Figure 15:
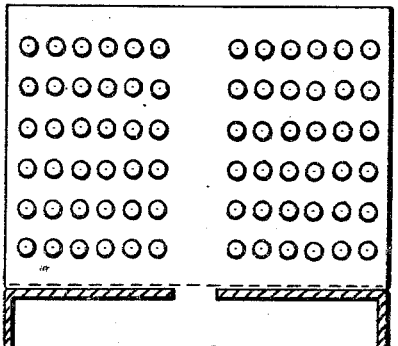

It will be noted that the embodiment of the apparatus illustrated in Figs. 8 and 9 produces a pattern of deposited glue such as that illustrated in Fig. 15. If a single cam lobe were to be substituted for the two cam lobes 55 and 55a, a pattern of deposited glue would be obtained like that of Fig. 10. Furthermore, the cam 51 might be omitted whereby a pattern of deposited glue might be obtained like that of Fig. 12 or Fig. 14, depending upon whether a single or double cam lobe arrangement is employed on the cam wheel 54.

Returning to Fig. 1, it will be noted that the apparatus shown includes glue applying apparatus like that of Figs. 2 and 3 for both of the upper case flaps 26. The gluing apparatus at the right-hand side of Fig. 1 may be a duplicate of that at the left-hand side, and may be driven by the same shaft 40 seen in Figs. 2 and 3. If the lower flaps 27 are also to be glued, similar gluing apparatus may be provided for these flaps. In Fig. 8 it will be noted that the shaft 44 is operatively connected through links 60, 61, and 62 to a shaft 63. The shaft 63 may serve the same function with respect to the lower gluing mechanisms as the shaft 40 of Figs. 2 and 3 serves for the two upper gluing mechanisms.

The embodiment of the invention illustrated in Figs. 5, 6, and 7 differs from that illustrated in Figs. 2, 3, and 4 in that the member upon which the gluing valves 31 are mounted is rotatable. In this embodiment a rotatable member 70, preferably cylindrical in shape, is arranged to carry the glue valves 31 thereon. The cylinder 70 is shown rotatably mounted on a pair of brackets 71 which are pivotable about a shaft 72 and joined by a bar 72a. Preferably, the bracket assembly, and hence the cylinder 70, are resiliently urged away from the back-up roller 34 by any suitable spring means, not shown in the drawings.

Secured to the bracket assembly is an arm 73 having a roller 74 which bears against a cam shaft 75. At the lower end of this cam shaft there is provided a cam surface 75a which is so shaped as to force the roller 74 and hence the cylinder 70 toward the back-up roller once during each oscillation of the cam shaft. The latter is preferably driven by the apparatus of Fig. 8 whereby it may oscillate in synchronism with the movement of the cases past the gluers. The cam may, for example, make one oscillation during the passage of each case past the gluing apparatus. The cam surface 75a may be of any desired form. For example, it may have two elevated surface portions of such configuration as to drive the cylinder 70 toward the back-up roller twice during the passage of each successive case flap. The height of these cam surface portions is such that the gluing valves 31 on the cylinder 70 are brought into contact with the passing case flap when the roller 74 rides on these elevated cam surface portions.

Figure 11:
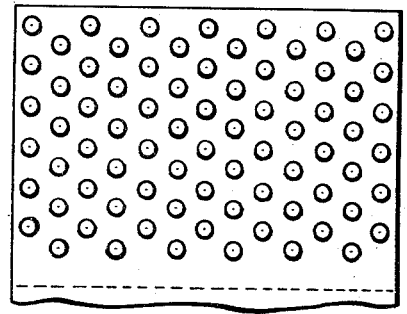

Preferably, the movement of the case flap between the back-up roller 34 and the cylinder 70 is depended upon to cause rotation of the cylinder 70, whereby a series of dots of adhesive are applied to the case flap in a pattern such as that illustrated in Figs. 10, 11 or 15. In such case, it has been found that operation is more reliable if pins 76 are arranged on the cylinder 70 to contact the passing case flap. This arrangement provides a positive drive for the cylinder 70.

Adhesive may be supplied to the interior of the cylinder 70 through a rotating connection located along the axis of rotation of the cylinder.

It will readily be seen that the apparatus shown in Figs. 5, 6, and 7 avoids the necessity of the relatively complex driving apparatus illustrated in Figs. 8 and 9 and employed with the gluing apparatus of Figs. 2, 3, and 4.

It will now be seen that novel and simple apparatus of various forms are provided in accordance with the invention for applying adhesive to case flaps in small, discrete areas, whereby the adhesive may dry or set rapidly, and for applying adhesive to case flaps while in vertical position, whereby the machine may be narrower and shorter than is conventional. The machine may be narrower since the closing flaps and the glue applicators extend upwardly rather than outwardly. It may be shorter since automatic closing of the flaps as the cases advance beyond the gluing station requires moving the flaps through only 90° rather than 180°. It will readily be seen that the disclosed apparatus may, if preferred, operate on closing flaps in any other desired positions, including outwardly bent, horizontal positions.

While particular embodiments of the invention have been shown, it will be understood, of course, that the invention is not limited thereto since many modifications may be made, and it is therefore contemplated to cover by the appended claims any such inventions as fall within the true spirit and scope of the invention.

We claim:

1. Apparatus for applying adhesive to case flaps comprising a rotatable member, a plurality of pressure operable valves arranged on said member equidistant from the axis of rotation thereof, said valves being normally closed and being openable by application of pressure directed radially inwardly of said axis of rotation, and means for supplying adhesive under pressure to the radially inner side of said valves.

2. Apparatus for applying adhesive to case flaps comprising a generally cylindrical container member rotatable about its axis, said container member defining a plurality of openings through the cylindrical surface thereof, a plurality of pressure operable valves normally closing said openings, said valves being openable by application of pressure thereagainst from outside said container member, and means for supplying adhesive under pressure to the inner side of said valves.

3. Apparatus for applying adhesive to case flaps comprising a generally cylindrical container member rotatable about its axis, said container member defining a plurality of openings through the cylindrical surface thereof, a plurality of pressure operable valves normally closing said openings, said valves being openable by application of pressure thereagainst from outside said container member, means for supplying adhesive under pressure to the inner side of said valves, and a backup roller positioned closely adjacent said cylindrical member and rotatable about an axis parallel to the axis of rotation of said cylindrical member.

4. Apparatus for applying adhesive to case flaps comprising, a generally cylindrical container member rotatable about its axis, said container member defining a a plurality of openings through the cylindrical surface thereof, a plurality of pressure operable valves normally closing said openings, said valves being openable by application of pressure thereagainst from outside said container member, means for supplying adhesive under pressure to the inner side of said valves, a backup roller positioned closely adjacent said cylindrical member and rotatable about an axis parallel to the axis of rotation of said cylindrical member, and means for moving case flaps between said backup roller and said cylindrical member, said roller and said member being so spaced apart that passage of a case flap therebetween causes pressure on said valves to permit passage of adhesive therethrough.

5. Apparatus for applying adhesive to case flaps comprising, a generally cylindrical container member rotatable about its axis, said container member defining a plurality of openings through the cylindrical surface thereof, a plurality of pressure operable valves normally closing said openings, said valves being openable by application of pressure thereagainst from outside said container member, means for supplying adhesive under pressure to the inner side of said valves, a backup roller positioned closely adjacent said cylindrical member and rotatable about an axis parallel to the axis of rotation of said cylindrical member, means for moving case flaps between said backup roller and said cylindrical member, said roller and said member being so spaced apart that passage of a case flap therebetween causes pressure on said valves to permit passage of adhesive therethrough, and means secured to said cylindrical member for engaging such case flap and causing rotation of said member in synchronism with movement of such case flap.

6. In a machine for applying adhesive to two outer flaps of a case whereby such flaps may be made to adhere to inner flap means to seal such case, means for moving a case along a definite path, roller means for engaging the outer surfaces of said outer flaps of such case to restrain said flaps from bending outwardly substantially beyond parallelism with the sides of the case to which said flaps are connected, means for applying adhesive to the inner surfaces of said outer flaps while said flaps are so restrained, said adhesive applying means including a rotatable member, a plurality of pressure operable valves arranged on said member equidistant from the axis of rotation thereof, said valves being normally closed and being openable by application of pressure directed radially inwardly of said axis of rotation, means for supplying adhesive under pressure to the radially inner side of said valves, and means for moving said rotatable member toward one of said roller means whereby said pressure operable valves may press against a case flap passing between said rotatable member and said roller means to deposit adhesive thereon.

References Cited in the file of this patent

UNITED STATES PATENTS

| | | |
|---|---|---|
| 1,647,072 | Bergstein | Oct. 25, 1927 |
| 2,081,758 | Milmoe | May 25, 1937 |
| 2,347,445 | Von Hofe | Apr. 25, 1944 |
| 2,354,688 | Kimball et al. | Aug. 1, 1944 |
| 2,366,411 | La Hatte et al. | Jan. 2, 1945 |
| 2,533,704 | Zanetti | Dec. 12, 1950 |
| 2,603,181 | Van Buren | July 15, 1952 |